(12) United States Patent
Koura

(10) Patent No.: US 7,090,289 B2
(45) Date of Patent: Aug. 15, 2006

(54) VEHICLE HOOD

(75) Inventor: Fumihiro Koura, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 11/154,423

(22) Filed: Jun. 15, 2005

(65) Prior Publication Data

US 2005/0280287 A1    Dec. 22, 2005

(30) Foreign Application Priority Data

Jun. 21, 2004    (JP)    ............................. 2004-182383

(51) Int. Cl.
*B62D 25/10* (2006.01)
(52) U.S. Cl. ............................ 296/193.11; 296/187.04; 296/187.09; 180/69.21
(58) Field of Classification Search ........... 296/187.03, 296/187.04, 187.09, 191, 193.11; 180/69.2, 180/69.21
See application file for complete search history.

(56) References Cited

U.S. PATENT DOCUMENTS

| | | | | |
|---|---|---|---|---|
| 5,124,191 A | * | 6/1992 | Seksaria | ..................... 180/69.2 |
| 5,535,841 A | * | 7/1996 | Cobes et al. | ............... 180/69.2 |
| 6,048,022 A | * | 4/2000 | Ishibashi et al. | ....... 296/187.09 |
| 2002/0003054 A1 | * | 1/2002 | Kamada et al. | ............ 180/69.2 |
| 2004/0021342 A1 | * | 2/2004 | Fujimoto | ................ 296/193.11 |
| 2004/0178662 A1 | * | 9/2004 | Carroll et al. | .......... 296/187.03 |
| 2005/0082875 A1 | * | 4/2005 | Ikeda et al. | ............ 296/193.11 |
| 2005/0088016 A1 | * | 4/2005 | Ito et al. | ................. 296/193.11 |
| 2005/0161979 A1 | * | 7/2005 | Chernoff et al. | ............ 296/191 |

FOREIGN PATENT DOCUMENTS

| | | | |
|---|---|---|---|
| EP | 1 357 018 A1 | 10/2003 | |
| FR | 2621677 A1 | * 4/1989 | .................. 296/191 |
| JP | 59-176166 | 10/1984 | |
| JP | 2003-191865 | 7/2003 | |
| JP | 2003191865 | * 9/2003 | |

OTHER PUBLICATIONS

Machine translation of JP2003-191865-A.*

* cited by examiner

*Primary Examiner*—Jason Morrow
(74) *Attorney, Agent, or Firm*—Brooks Kushman P.C.

(57) ABSTRACT

A vehicle hood includes a hood outer panel and a panel-shaped hood reinforcement which is arranged at the underside of the hood outer panel. The hood reinforcement includes an integral bend which extends in the vehicle width direction to allow the hood reinforcement to bend in the front to rear direction of the vehicle in a frontal crash. A bulge formed in the hood outer panel and the bend of the hood reinforcement are so arranged that the front end of the bulge and the bend substantially coincide with each other when viewed in plan.

14 Claims, 6 Drawing Sheets

US 7,090,289 B2

VEHICLE HOOD

CROSS-REFERENCE TO RELATED APPLICATION

This non-provisional application claims priority under 35 U.S.C. §119(a) on Patent Application No. 2004-182383 filed in Japan on Jun. 21, 2004, the entire contents of which are hereby incorporated by reference.

BACKGROUND OF THE INVENTION (a) Field of the Invention

The present invention relates to a vehicle hood including a hood outer panel and a hood reinforcement arranged at the underside of the hood outer panel. In particular, it relates to an improvement in bending of the vehicle hood in a frontal crash.

(b) Description of Related Art

For improvements in safety of pedestrians and impact absorption of vehicles, there have been known vehicle hoods including a hood outer panel which is configured to bend surely at a predetermined position in a frontal crash.

Such vehicle hoods, however, have a problem. If the hood outer panel is formed with a bulge protruding upward beyond the other part of the hood outer panel for providing space for mounting engine auxiliaries, the hood outer panel is hindered from bending at a predetermined position in a frontal crash because the bulge is highly rigid than the other part and not easily deformed.

Accordingly, for example, Japanese Unexamined Patent Publication S59-176166 discloses forming the bulge as a separated part from the hood outer panel so that the bulge comes off the hood outer panel in a frontal crash.

Further, in conventional vehicle hoods, a lattice-formed frame (corresponding to a hood reinforcement) is provided at the underside of the hood outer panel. Since the lattice-formed frame is highly rigid at the lattice points, a pedestrian is greatly damaged if he/she is bumped against the lattice points. Accordingly, in response to the need for the protection of pedestrians in recent years, Japanese Unexamined Patent Publication No. 2003-191865 discloses a hood reinforcement which is panel-shaped to correspond to the shape of the hood outer panel.

However, since the former conventional vehicle hood includes the bulge separated from the hood outer panel, parts count increases, resulting in an increase in cost. If the bulge is integrally formed with the hood outer panel for design purposes, the bulge cannot come off the hood outer panel.

In the latter conventional vehicle hood, the state of bonding between the panel-shaped hood reinforcement and the hood outer panel becomes substantially uniform. This brings about dispersion of load of a frontal crash, and therefore the hood outer panel does not easily bend along a bend line at a predetermined position.

Moreover, if the hood outer panel and the hood reinforcement each have a convex form at the front ends thereof for design purposes when viewed in plan, the front end of the hood is reduced in rigidity. Therefore, in a frontal crash, the front end of the hood is deformed easily and the load of the crash is not smoothly transferred rearward. As a result, a bend line cannot be formed at a predetermined position.

SUMMARY OF THE INVENTION

Under these circumstances, the present invention has been achieved. An object of the present invention is to improve safety of pedestrians and impact absorption of vehicles in a frontal crash. To achieve the object, the inventor of the present invention has added a twist to the structure of a hood reinforcement such that a hood outer panel is bent at a predetermined position in a frontal crash.

Thus, in the present invention, a bend is provided at a proper position of the hood reinforcement.

More specifically, the present invention is directed to a vehicle hood comprising: a hood outer panel; a panel-shaped hood reinforcement which is arranged at the underside of the hood outer panel and includes an integral bend which extends in the vehicle width direction to allow the hood reinforcement to bend in the front to rear direction of the vehicle in a frontal crash. The hood outer panel includes an integral bulge which protrudes upward and the bend is arranged near the front end of the bulge.

Since the bulge is integrally formed in the hood outer panel for design purposes or the like, part of the hood outer panel provided with the bulge increases in rigidity, while the vicinity of the front end of the bulge is lower in rigidity than the bulge. Therefore, in a frontal crash, the load of the crash applied to the hood outer panel does not deform the bulge, but tends to be concentrated on the vicinity of the front end of the bulge which is more likely to be deformed than the bulge.

The hood outer panel includes the integral bulge which protrudes upward. It is preferred that the bulge and the bend are so arranged that the front end of the bulge and the bend substantially coincide with each other when viewed in plan.

Since the bend of the hood reinforcement and the bulge are so arranged that they substantially coincide with each other when viewed in plan, load concentrated on the front end of the bulge promotes bending of the hood reinforcement at the bend. As a result, the hood outer panel is easily bent along the bend when viewed in plan. Unlike the conventional one, the bulge does not hinder the bending at the bend, but functions as a starting point for bending the hood outer panel surely at a predetermined position. By bending the hood outer panel at the predetermined position with reliability, good design and safety performance against crash are both achieved.

In the present invention, the bulge and the bend may be so arranged that a bend line is formed along the bend and the edge of the front part of the bulge when viewed in plan.

By so doing, even if the bend of the hood reinforcement intersects the bulge, load concentrated on the vicinity of the front end of the bulge promotes bending of the hood reinforcement at the bend. As a result, the hood outer panel is bent along the bend line formed along the bend and the edge of the front part of the bulge when viewed in plan. Unlike the conventional one, the bulge does not hinder the bending at the bend, but functions as a starting point for bending the hood outer panel surely at a predetermined position. By bending the hood outer panel at the predetermined position with reliability, good design and safety performance against crash are both achieved.

In the present invention, the hood outer panel preferably includes a shelf which substantially horizontally extends outward from the periphery of the bulge by a predetermined distance.

In a frontal crash, load applied from the front is transferred rearward along the hood outer panel. At this time, the bulge which is highly rigid is not easily deformed. Therefore, the front end of the shelf which is less rigid than the bulge protrudes upward and the load tends to be concentrated on the rear end of the shelf. As a result, the hood reinforcement is bent along the bend with great ease, promoting the deformation of the hood outer panel.

In the present invention, if the hood outer panel and the hood reinforcement each have a convex form at the front ends thereof when viewed in plan, it is preferred that the hood reinforcement includes a reinforcing frame of concave section which is arranged at the peripheral portion of the hood reinforcement to dent toward the underside of the hood outer panel and part of the reinforcing frame located between the front end of the vehicle and the bend has a larger sectional width than the other part.

If the hood outer panel and the hood reinforcement each have a convex foam at the front ends thereof for design purposes, the front part of the hood becomes less rigid. Accordingly, the front part of the hood is easily deformed in a frontal crash and the load of the crash is less likely to be transferred to the bend. However, according to the present invention, part of the reinforcing frame located between the front end of the vehicle and the bend has a larger sectional width than the other part. The thus configured reinforcing frame surely transfers the load of the frontal crash to the bend, thereby bending the hood reinforcement along the bend with ease. This offers both good design and safety performance against crash.

In the present invention, it is preferred that the hood reinforcement is provided with a plurality of dimples which are dented substantially in the form of a conical trapezoid toward the underside of the hood outer panel and a plurality of openings which are formed around the dimples.

With this configuration, part of the hood reinforcement provided with the reinforcing frame shows the highest rigidity, while part of the hood reinforcement within the reinforcing frame is relatively low in rigidity. By providing the dimples which are substantially in the form of a conical trapezoid in a suitable manner, part of the hood reinforcement provided with the dimples increases in rigidity. Further, by suitably providing the openings around the dimples, the rigidity is reduced to some extent. As a result, impact to the hood is suitably dispersed irrespective of the part of the hood with which a pedestrian collides. The openings also have the effect of reducing the mass of the hood reinforcement.

DETAILED DESCRIPTION OF THE INVENTION

Hereinafter, embodiments of the present invention will be described with reference to the drawings.

(Embodiment 1)

Figure 1:
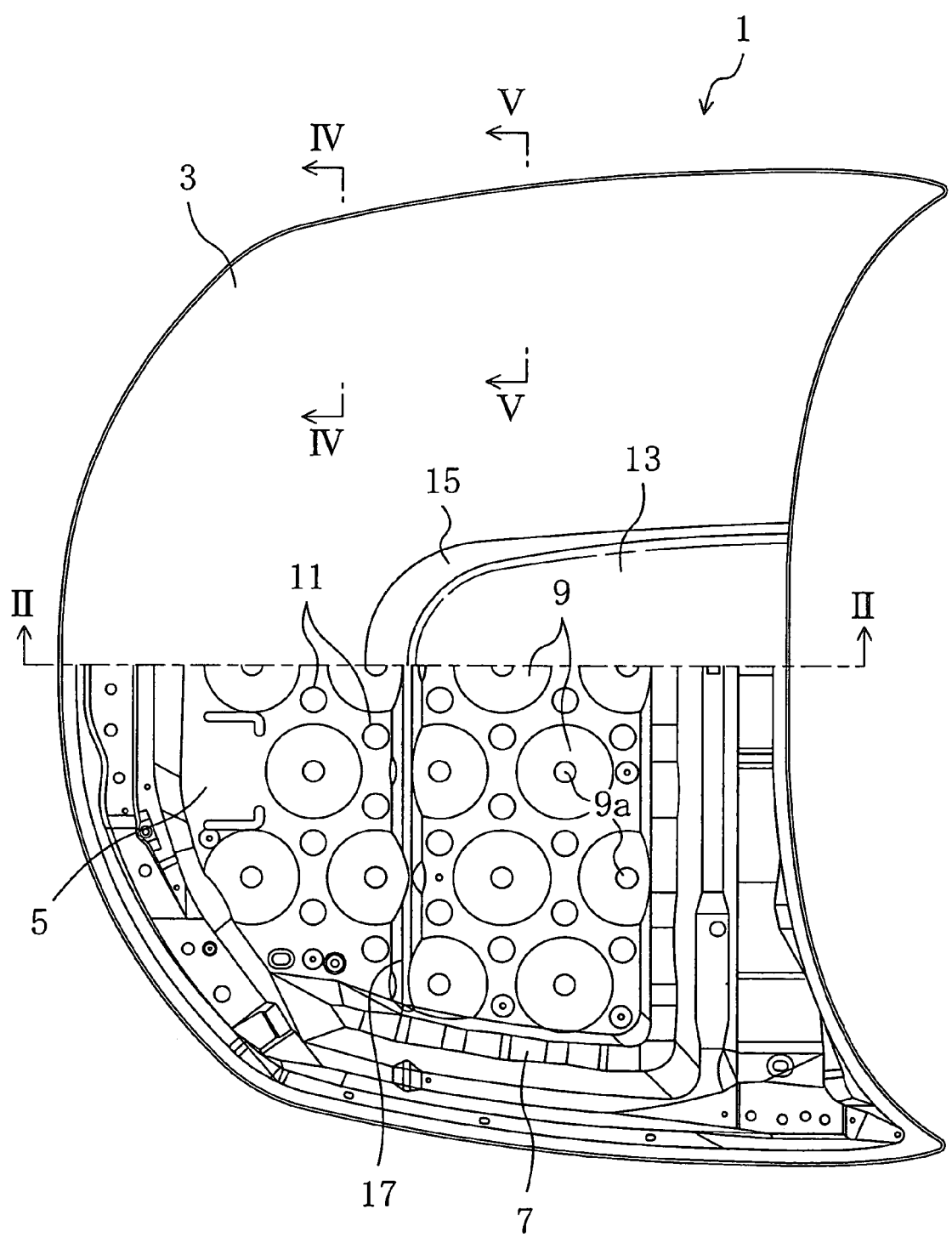
FIG. 1 is a plan view, partially cut away, of a vehicle hood according to Embodiment 1 of the present invention.

FIG. 1 shows a hood 1 which is a vehicle hood according to Embodiment 1 of the present invention. The hood 1 includes a hood outer panel 3 as an outer plate and a hood reinforcement 5 which is shaped to correspond to the shape of the hood outer panel 3 and bonded to the underside of the hood outer panel 3 with an adhesive 10. In FIG. 1, the hood outer panel 3 is partially cut away to show the hood reinforcement 5.

When viewed in plan, the hood 1 (the hood outer panel 3 and the hood reinforcement 5) has a convex form at the front end thereof for design purposes. That is, the front part of the vehicle is rounded.

Figure 2:
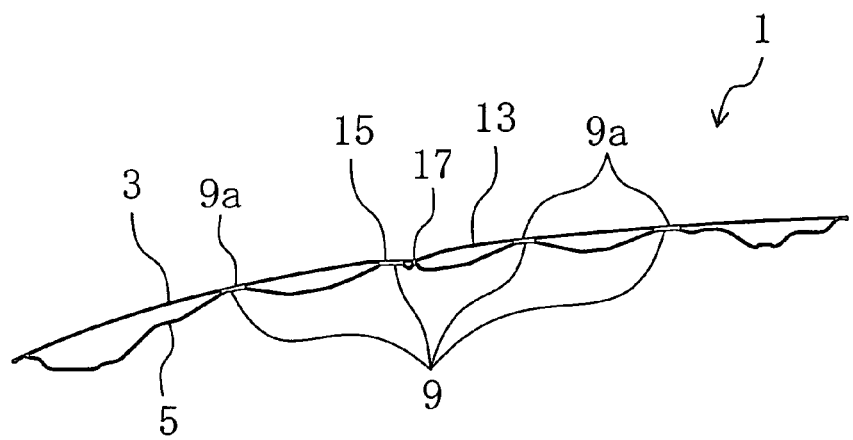
FIG. 2 is a sectional view taken along the line II—II shown in FIG. 1.
Figure 3:
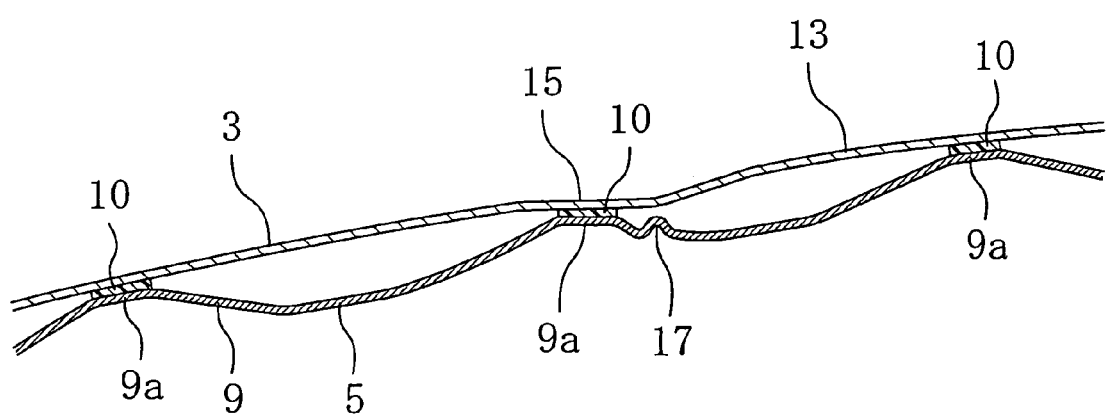
FIG. 3 is a partially enlarged view of FIG. 2.

As shown in FIGS. 2 and 3, the hood outer panel 3 and the hood reinforcement 5 are so arranged that space is provided between the underside of the hood outer panel 3 and the top side of the hood reinforcement 5. The front part of the hood reinforcement 5 bulges more downward than the other part to make the space at the front part larger than that at the other part.

Figure 4:
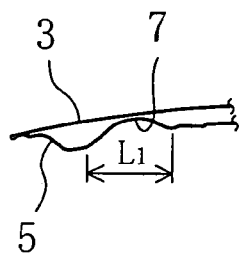
FIG. 4 is a sectional view taken along the line IV—IV shown in FIG. 1.
Figure 5:
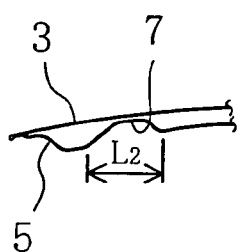
FIG. 5 is a sectional view taken along the line V—V shown in FIG. 1.

As shown in FIGS. 1, 4 and 5, the hood reinforcement 5 includes a reinforcing frame 7 of concave section which is arranged at the peripheral portion of the hood reinforcement 5 to dent toward the underside of the hood outer panel 3. The reinforcing frame 7 is provided to improve the rigidity of the hood reinforcement 5. The hood reinforcement 5 is formed with a concave which is continuously formed along the back part and the side parts thereof except the front part, whereby the reinforcing frame 7 is provided substantially in the form of the letter U when viewed in plan.

The hood reinforcement 5 is provided with a plurality of dimples 9 which are dented substantially in the form of a conical trapezoid toward the underside of the hood outer panel 3. Further, a plurality of openings 11 are formed around each of the dimples 9 so that the dimples 9 and the openings 11 are arranged in a regular array. Each of the dimples 9 is bonded to the underside of the hood outer panel 3 at the bottom 9a thereof with an adhesive 10.

In the middle of the hood outer panel 3 in the vehicle width direction, a bulge 13 is provided for design purposes. The bulge 13 is formed integrally with the hood outer panel 3 and protrudes upward. More specifically, the hood outer panel 3 includes a shelf 15 which substantially horizontally extends outward from the periphery of the bulge 13 by a predetermined distance. The shelf 15 is formed at a lower level than the bulge 13. That is, the bulge 13 is formed as if it protrudes from the shelf 15.

The hood reinforcement 5 further includes a bend 17 which is substantially inverted V-shaped when viewed in section as shown in FIG. 3 and extends along the vehicle width direction when viewed in plan. The bend 17 and the bulge 13 are so arranged that the front end of the bulge 13 and the bottom of the bend 17 (end part thereof near the underside of the hood outer panel 3) substantially coincide with each other when viewed in plan. The bend 17 is less rigid than the other part of the hood reinforcement 5. Therefore, in a frontal crash, the bend 17 protrudes upward to bend the hood reinforcement 5 in the front to rear direction of the vehicle along the bend 17, thereby forming a bend line 19 extending in the vehicle width direction in the hood outer panel 3 (shown in FIG. 6).

When viewed in section, part of the reinforcing frame 7 located between the front end of the vehicle and the bend 17 has a width L1 in the vehicle width direction (shown in FIG. 4) which is larger than a width L2 (shown in FIG. 5) of the other part of the reinforcing frame 7.

Now, an explanation is given of the action of the vehicle hood of this embodiment.

Figure 6:
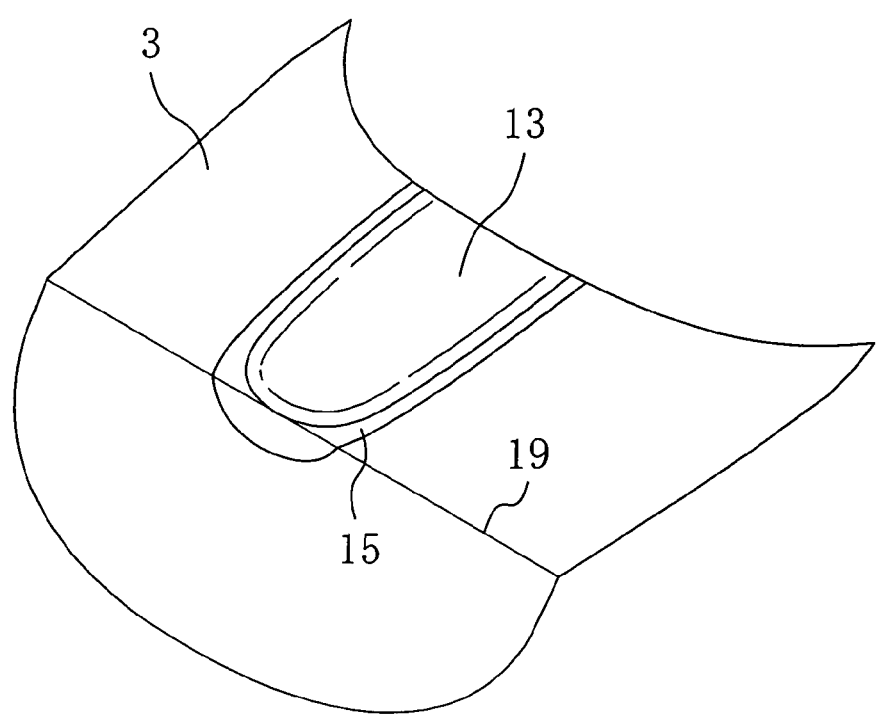
FIG. 6 is an oblique view illustrating how the vehicle hood according to Embodiment 1 of the present invention is deformed.

Referring to FIG. 6, when the vehicle collides against an obstacle at the front, the front part of the hood 1 is deformed. Load applied to the front part is transferred rearward through the reinforcing frame 7. At the same time, part of the hood reinforcement 5 within the reinforcing frame 7 and the hood outer panel 3 are also deformed rearward.

When the load is transferred to the shelf 15 of the hood outer panel 3, high stress is applied to the vicinity of the front end of the bulge 13 which is highly rigid. As a result, the shelf 15 which is less rigid than the bulge 13 protrudes upward at the front end thereof in the shape of an inverted V. Simultaneously, the load is also transferred to the bend 17 of the hood reinforcement 5.

As the load is concentrated on the rear end of the shelf 15 (the front end of the bulge 13) and the bottom of the bend 17 of the hood reinforcement 5, the hood outer panel 3 and the hood reinforcement 5 are bent in the front to rear direction of the vehicle along the bend 17 to form the bend line 19 extending in the vehicle width direction.

If the head of a pedestrian collides with the hood 1 from above, the load applied to the hood outer panel 3 is transferred to the hood reinforcement 5 through the dimples 9. Since the openings 11 weaken the repulsion of the load, damage to the pedestrian head is reduced.

Thus, in the vehicle hood according to Embodiment 1, the front end of the bulge 13 protruding upward from the hood outer panel 3 substantially coincides with the bend 17 of the hood reinforcement 5 when viewed in plan. Therefore, the front end of the highly rigid bulge 13 actively functions as a starting point for bending the hood outer panel 3 surely at a predetermined position. This offers both good design and safety performance against crash.

Further, the hood outer panel 3 includes the shelf 15 which substantially horizontally extends outward from the periphery of the bulge 13 by a predetermined distance. Therefore, the load of a frontal crash tends to be concentrated on the rear end of the shelf 15, thereby bending the hood outer panel 3 along the bend 17 with great ease.

In the hood reinforcement 5 of the hood 1 which has a convex form at the front end thereof when viewed in plan, part of the reinforcing frame 7 located between the front end of the vehicle and the bend 17 has a larger sectional width than the other part. Therefore, the load of a frontal crash is surely transferred to the bend 17, thereby bending the hood reinforcement 5 along the bend 17 with ease.

Further, since the dimples 9 substantially in the form of a conical trapezoid and the openings 11 are formed in the hood reinforcement 5, impact on pedestrians in a frontal crash is dispersed by the dimples 9 and the openings 11 and the mass of the hood reinforcement 5 is reduced by the openings 11.

(Embodiment 2)

Figure 7:
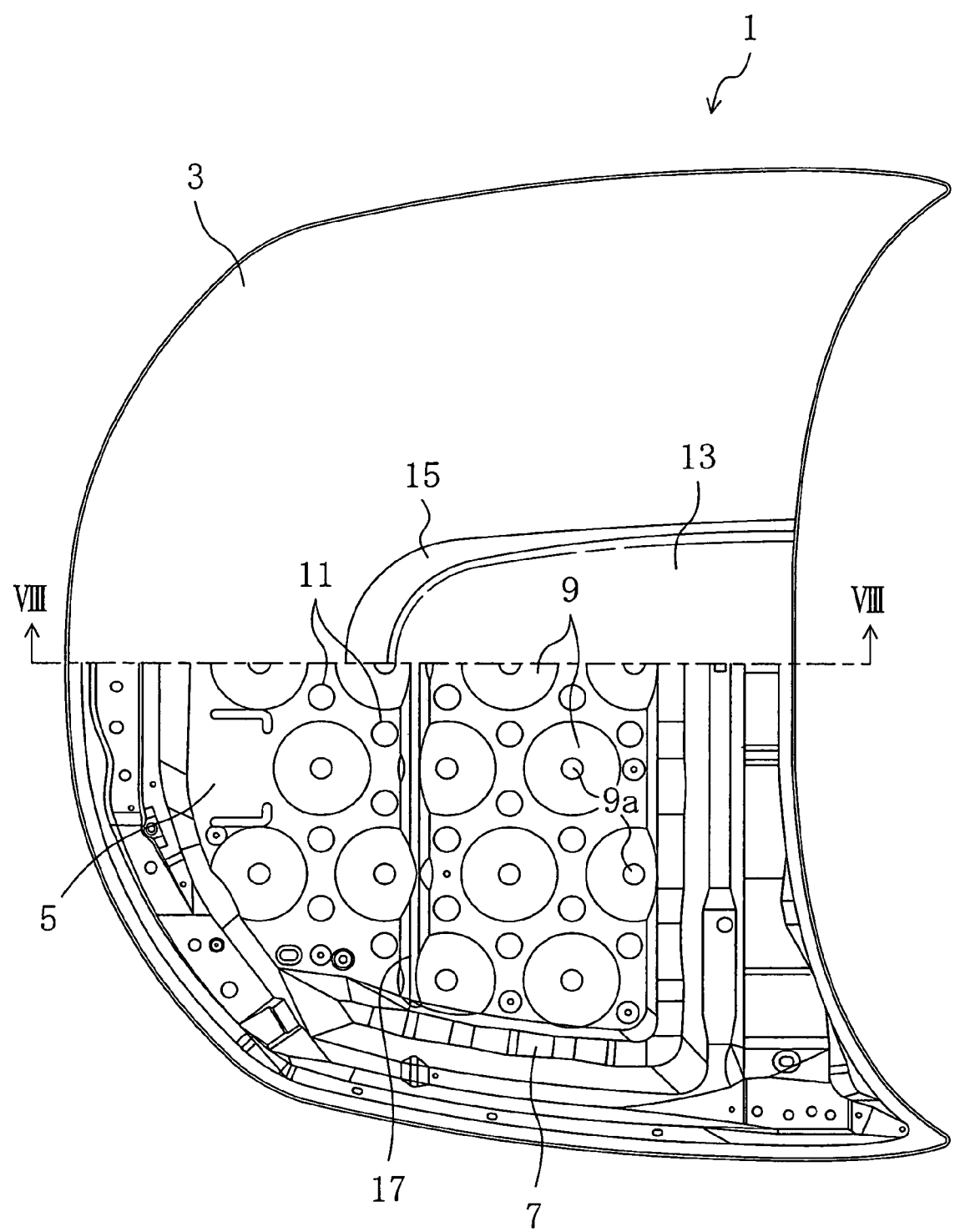
FIG. 7 is a plan view, partially cut away, of a vehicle hood according to Embodiment 2 of the present invention.
Figure 8:
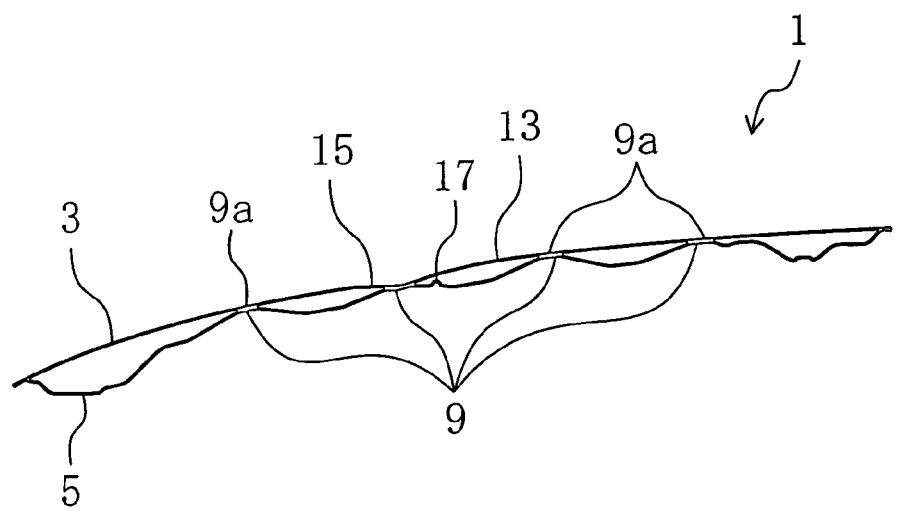
FIG. 8 is a sectional view taken along the line VIII—VIII shown in FIG. 7.
Figure 9:
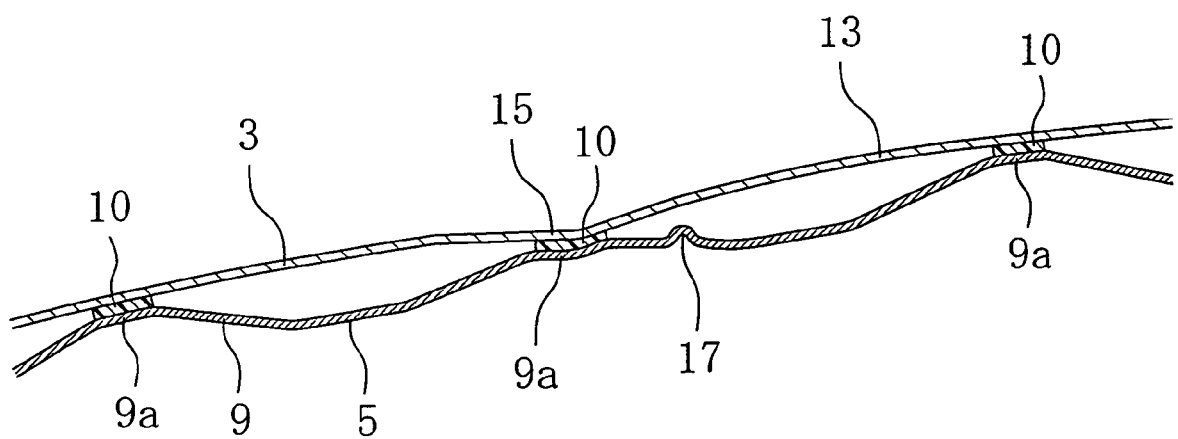
FIG. 9 is a partially enlarged view of FIG. 8.

FIGS. 7 to 9 show a vehicle hood 1 according to Embodiment 2 of the present invention. The vehicle hood 1 of Embodiment 2 differs from that of Embodiment 1 in the positional relationship between the bend 17 of the hood reinforcement 5 and the bulge 13. In FIGS. 7 to 9, the same components as those shown in FIGS. 1 to 6 are given with the same reference numerals and a detailed explanation thereof is omitted.

Unlike Embodiment 1, when viewed in plan, the bend 17 of the hood reinforcement 5 extending in the vehicle width direction intersects the front part of the bulge 13. That is, the bend 17 and the bulge 13 are so arranged that the bend line 19 is formed along the bend 17 and the edge of the front part of the bulge 13 in a frontal crash.

Figure 10:
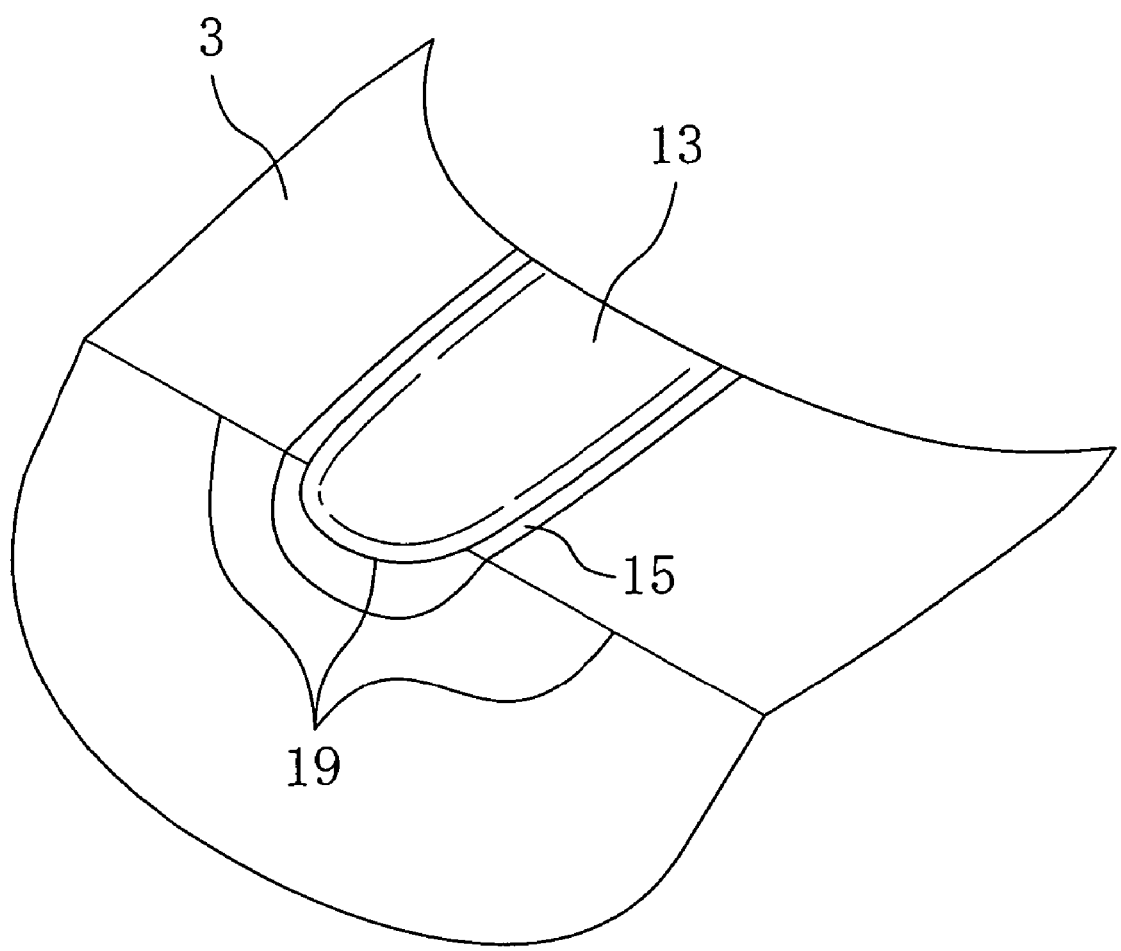
FIG. 10 is an oblique view illustrating how the vehicle hood according to Embodiment 2 is deformed.

In a frontal crash, the vehicle hood 1 functions in the same manner as described in Embodiment 1. The vehicle hood 1 is different from that of Embodiment 1 in that the hood outer panel 3 is bent in the front to rear direction of the vehicle along the bend line 19 formed along the bend 17 and the edge of the front part of the bulge 13 as shown in FIG. 10.

Thus, according to this embodiment, the front part of the bulge 13 actively functions as a starting point for bending the hood outer panel 3 surely at a predetermined position. This offers both good design and safety performance against crash.

(Other Embodiments)

The vehicle hoods of Embodiments 1 and 2 may be configured as follows.

In the foregoing embodiments, the hood 1 includes the shelf 15, but the shelf 15 is not essential for the hood 1. Further, the hood 1 includes the bulge 13, but the present invention is also applicable to the hood which is not provided with the bulge 13. More specifically, in the hood reinforcement 5 of the hood 1 which has a convex form at the front end thereof, part of the reinforcing frame 7 located between the front end of the vehicle and the bend 17 is formed to have a larger sectional width than the other part. As a result, the load of a frontal crash is surely transferred to the bend 17, thereby bending the hood 1 along the bend 17 with reliability. This offers both design and safety performance against crash.

The foregoing embodiments are merely given as preferable examples and will not limit the prevent invention, applications and usage thereof.

What is claimed is:

1. A vehicle hood comprising:
    a hood outer panel; and
    a panel-shaped hood reinforcement which is arranged at the underside of the hood outer panel and includes an integral bend having an inverted V-shape which extends in the vehicle width direction to allow the hood reinforcement to bend in the front to rear direction of the vehicle in a frontal crash, wherein the hood outer panel includes an integral bulge which protrudes upward and the bulge and the bend are so arranged that the front end of the bulge and the bend substantially coincide with each other when viewed in plan.

2. A vehicle hood according to claim 1, wherein
    the hood outer panel includes a shelf which substantially horizontally extends outward from the periphery of the bulge by a predetermined distance.

3. A vehicle hood according to claim 2, wherein
    the hood reinforcement is provided with a plurality of dimples which are dented substantially in the form of a conical trapezoid toward the underside of the hood outer panel and a plurality of openings which are formed around the dimples.

4. A vehicle hood according to claim 1, wherein
    the hood outer panel and the hood reinforcement each have a convex form at the front ends thereof when viewed in plan,
    the hood reinforcement includes a reinforcing frame of concave section which is arranged at the peripheral portion of the hood reinforcement to dent toward the underside of the hood outer panel, and part of the reinforcing frame located between the front end of the vehicle and the bend has a larger sectional width than the other part.

5. A vehicle hood according to claim 4, wherein the hood reinforcement is provided with a plurality of dimples which are dented substantially in the form of a conical trapezoid toward the underside of the hood outer panel and a plurality of openings which are formed around the dimples.

6. A vehicle hood according to claim 5, wherein the hood outer panel includes a shelf which substantially horizontally extends outward from the periphery of the bulge by a predetermined distance.

7. A vehicle hood comprising:

a hood outer panel; and a panel-shaped hood reinforcement which is arranged at the underside of the hood outer panel and includes an integral bend having an inverted V-shape which extends in the vehicle width direction to allow the hood reinforcement to bend in the front to rear direction of the vehicle in a frontal crash, wherein the hood outer panel includes an integral bulge which protrudes upward and the bulge and the bend are so arranged that a bend line is formed along the bend and the edge of the front part of the bulge when viewed in plan.

8. A vehicle hood according to claim 7, wherein the hood outer panel includes a shelf which substantially horizontally extends outward from the periphery of the bulge by a predetermined distance.

9. A vehicle hood according to claim 8, wherein the hood reinforcement is provided with a plurality of dimples which are dented substantially in the form of a conical trapezoid toward the underside of the hood outer panel and a plurality of openings which are formed around the dimples.

10. A vehicle hood according to claim 7, wherein the hood outer panel and the hood reinforcement each have a convex form at the front ends thereof when viewed in plan, the hood reinforcement includes a reinforcing frame of concave section which is arranged at the peripheral portion of the hood reinforcement to bend toward the underside of the hood outer panel, and part of the reinforcing frame located between the front end of the vehicle and the bend has a larger sectional width than the other part.

11. A vehicle hood according to claim 10, wherein the hood reinforcement is provided with a plurality of dimples which are dented substantially in the form of a conical trapezoid toward the underside of the hood outer panel and a plurality of openings which are formed around the dimples.

12. A vehicle hood according to claim 11, wherein the hood outer panel includes a shelf which substantially horizontally extends outward from the periphery of the bulge by a predetermined distance.

13. A vehicle hood comprising:

a hood outer panel; and a panel-shaped hood reinforcement which is arranged at the underside of the hood outer panel and includes an integral bend having an inverted V-shape which extends in the vehicle width direction to allow the hood reinforcement to bend in the front to rear direction of the vehicle in a frontal crash, wherein the hood outer panel includes an integral bulge which protrudes upward, the hood outer panel and the hood reinforcement each have a convex form at the front ends thereof when viewed in plan, the hood reinforcement includes a reinforcing frame of concave section which is arranged at the peripheral portion of the side ends of the hood reinforcement to dent toward the underside of the hood outer panel, and part of the reinforcing frame located between the front end of the vehicle and the bend has a larger sectional width than the other part.

14. A vehicle hood according to claim 13, wherein the hood reinforcement is provided with a plurality of dimples which are dented substantially in the form of a conical trapezoid toward the underside of the hood outer panel and a plurality of openings which are formed around the dimples.

* * * * *